US010095326B2

(12) United States Patent
Aloui et al.

(10) Patent No.: US 10,095,326 B2
(45) Date of Patent: Oct. 9, 2018

(54) METHOD FOR CONTINUOUSLY DETECTING A STATE OF CONTACT OR NON-CONTACT BETWEEN A TIP OF AN INSTRUMENT AND A WRITING MEDIUM HAVING A VARIABLE THICKNESS, AND RELATED SYSTEM

(71) Applicant: ISKN, Saint Martin D'Heres (FR)

(72) Inventors: Rabeb Aloui, Fontaine (FR); Tristan Hautson, Fontaine (FR)

(73) Assignee: ISKN, Saint Martin D'Heres (FR)

( * ) Notice: Subject to any disclaimer, the term of this patent is extended or adjusted under 35 U.S.C. 154(b) by 0 days.

(21) Appl. No.: 15/534,830

(22) PCT Filed: Dec. 7, 2015

(86) PCT No.: PCT/EP2015/078816
§ 371 (c)(1),
(2) Date: Jun. 9, 2017

(87) PCT Pub. No.: WO2016/091799
PCT Pub. Date: Jun. 16, 2016

(65) Prior Publication Data
US 2017/0351350 A1  Dec. 7, 2017

(30) Foreign Application Priority Data

Dec. 9, 2014 (FR) ...................... 14 62107

(51) Int. Cl.
*G06F 3/0354* (2013.01)
*G06F 3/038* (2013.01)

(52) U.S. Cl.
CPC .......... *G06F 3/03545* (2013.01); *G06F 3/038* (2013.01)

(58) Field of Classification Search
None
See application file for complete search history.

(56) References Cited

U.S. PATENT DOCUMENTS

| 5,615,284 | A  | * | 3/1997  | Rhyne ............... G06K 9/033 382/187 |
| 5,825,352 | A  | * | 10/1998 | Bisset ............... G06F 3/044 345/173 |
| 6,625,314 | B1 | * | 9/2003  | Okamoto .......... G06F 3/03545 178/19.01 |
| 8,782,550 | B1 | * | 7/2014  | Patridge ............ G06F 3/0488 715/702 |
| 2003/0152268 | A1 | * | 8/2003 | Seto .................. G06K 9/222 382/187 |
| 2006/0214926 | A1 | * | 9/2006 | Kolmykov-Zotov ............ G06F 3/04842 345/179 |
| 2007/0205994 | A1 | * | 9/2007 | van Ieperen ...... G06F 3/0486 345/173 |

(Continued)

FOREIGN PATENT DOCUMENTS

FR   2 988 862 A1   10/2013
FR   2 988 874 A1   10/2013

*Primary Examiner* — Patrick Moon
*Assistant Examiner* — Peijie Shen
(74) *Attorney, Agent, or Firm* — Baker & Hostetler LLP

(57) ABSTRACT

A method is provided for continuously detecting a state of contact or non-contact between a tip of an instrument and a writing surface of a writing medium of variable thickness positioned on a bearing surface of a tracking device.

8 Claims, 6 Drawing Sheets

(56) References Cited

U.S. PATENT DOCUMENTS

| | | | |
|---|---|---|---|
| 2008/0159625 A1* | 7/2008 | Bhaskarabhatla | ........................... G06K 9/00409 382/179 |
| 2011/0074701 A1* | 3/2011 | Dickinson | ............... G06F 3/041 345/173 |
| 2013/0201151 A1* | 8/2013 | Takashima | .............. G06F 3/044 345/174 |
| 2014/0184551 A1* | 7/2014 | Igarashi | .................. G06F 3/041 345/173 |
| 2014/0300573 A1* | 10/2014 | Kimura | ................. G06F 3/0418 345/174 |
| 2015/0116248 A1* | 4/2015 | Niwa | .................. G06F 3/03545 345/173 |

* cited by examiner

METHOD FOR CONTINUOUSLY DETECTING A STATE OF CONTACT OR NON-CONTACT BETWEEN A TIP OF AN INSTRUMENT AND A WRITING MEDIUM HAVING A VARIABLE THICKNESS, AND RELATED SYSTEM

CROSS-REFERENCE TO RELATED APPLICATIONS

This application is a National Stage of International patent application PCT/EP2015/078816, filed on Dec. 7, 2015, which claims priority to foreign French patent application No. FR 1462107, filed on Dec. 9, 2014, the disclosure of which are incorporated by reference in their entirety.

FIELD OF INVENTION

The present invention relates to a method for continuously detecting a state of contact or non-contact between a tip of an instrument and a writing medium of variable thickness, and related system.

BACKGROUND

Methods and systems for continuously detecting a state of contact or non-contact between a tip of an instrument and a writing medium of variable thickness are known.

It is known practice to use a writing instrument bearing a contact detection device such as a pressure sensor, but such a writing tool needs to be provided with an electronic device employing an electrical power supply source.

It is also known practice to use a touch-sensitive writing surface, such as a touch interface, but such an approach does not allow passive media of variable thickness, such as a notebook, to be used.

It is also known practice to use a fixed contact threshold, for example as described in document FR 2988874, which does not allow faults in estimating the position of the tip of the writing instrument to be overcome, requires a submillimetric estimation error and is ineffective if the writing medium is deformed on contact with the instrument.

SUMMARY OF THE INVENTION

An aim of the invention is to alleviate these problems.

According to one aspect of the invention, a method is proposed for continuously detecting a state of contact or non-contact between a tip of an instrument and a writing surface of a writing medium of variable thickness positioned on a bearing surface of a tracking device; said method comprising the steps consisting in:

determining, at a current instant in time, the position of the tip of the instrument with respect to the bearing surface;

determining, at the current instant in time, a distance between the bearing surface and the tip, on the basis of said position of the tip;

updating the current value of a minimum distance between the bearing surface and the writing surface with the distance between the bearing surface and the tip at the current instant in time, when said distance is shorter than the current value of the minimum distance;

determining, at the current instant in time, a movement parameter of the tip, representative of a ratio of the movement tangential to the writing surface to the movement normal to the writing surface between the current instant in time and the preceding instant in time;

determining, at the current instant in time, an amplitude parameter representative of the amplitude of the movement of the tip between the current instant in time and the preceding instant in time;

determining a state of contact between the tip and the writing surface, at the current instant in time, when:
   the distance is shorter than or equal to the sum of a minimum current distance and a tolerance, said tolerance being representative of an uncertainty regarding the distance between the writing surface and the bearing surface;
   the movement parameter is representative of a movement that is essentially tangential to the writing surface, i.e. its value is lower than or equal to a tangential movement threshold; and
   a norm of the amplitude parameter is higher than or equal to a minimum amplitude threshold;
otherwise determining a state of non-contact between the tip and the writing surface, at the current instant in time.

Thus, it is possible to make an accurate estimate of the position of the tip of the writing instrument even if the writing medium is deformed on contact with the instrument. Thus, the invention works equally as well with a single sheet as with a notebook.

In one mode of implementation, a moving time window is used in which respective weighted means are used for said position, and/or said distance, and/or said movement parameter, and/or said amplitude parameter; the moving window comprising a set of data samples corresponding to a set of successive instants in time in which a current instant in time is considered, the other instants in time of the set preceding the current instant in time being considered to be past instants in time with respect to the moving window, and the other instants in time succeeding the current instant in time being considered to be future instants in time with respect to the current moving window.

Stated otherwise, in a current moving window comprising a plurality of successive instants in time, the current instant in time under consideration is not the last.

Thus, the accuracy of the method is improved, thereby making it possible to provide greater visibility regarding the nature of the movement and thus to decrease the incidence of false positives.

According to one mode of implementation, the method additionally comprises a step consisting in updating said tolerance when two successive operations of determining a state of contact or non-contact determine one and the same state.

Thus, the method adapts better to the state of the writing surface without losing reactivity during short losses of contact.

In one mode of implementation, when two successive operations of determining a state determine a state of contact, said tolerance is decreased without being able to be below a minimum tolerance threshold.

Thus, decreasing the tolerance allows the method to be reactive to short losses of contact.

According to one mode of implementation, when the movement parameter is representative of a movement that is essentially tangential to the writing surface, i.e. its value is lower than or equal to the tangential movement threshold (it would be desirable to keep it the same, since the same condition is defined), and when the distance is longer than the sum of the current minimum distance and the tolerance, the current minimum distance is increased.

Thus, increasing the minimum distance allows the method to track a potential change in the thickness of the medium according to the position of contact, which is of practical use in the case of media having a contact surface of irregular height.

In one mode of implementation, when two successive operations of determining a state determine a state of non-contact and the value of the movement parameter is lower than a maximum movement threshold, said tolerance is increased without being able to be above a maximum tolerance threshold.

According to one mode of implementation, the instrument is provided with a fixed magnetic element and the tracking device used is provided with an array of at least N triaxial magnetometers which are mechanically connected to one another with no degree of freedom in order to hold a known relative position of these magnetometers, N being an integer at least equal to 2.

Thus, it is possible to use passive writing media (paper, notebook, etc.) with a passive instrument (a simple stylus, etc.) to which a magnet is connected.

According to another aspect of the invention, a system is also proposed for continuously detecting a state of contact or non-contact between a tip of an instrument and a writing surface of a writing medium of variable thickness positioned on a bearing surface of a tracking device; said system comprising a computer capable of:

determining, at a current instant in time, the position of the tip of the instrument with respect to the bearing surface;

determining, at the current instant in time, a distance between the bearing surface and the tip, on the basis of said position of the tip;

updating the current value of a minimum distance between the bearing surface and the writing surface with the distance between the bearing surface and the tip at the current instant in time, when said distance is shorter than the current value of the minimum distance;

determining, at the current instant in time, a movement parameter of the tip, representative of a ratio of the movement tangential to the writing surface to the movement normal to the writing surface between the current instant in time and the preceding instant in time;

determining, at the current instant in time, an amplitude parameter representative of the amplitude of the movement of the tip between the current instant in time and the preceding instant in time;

determining a state of contact between the tip and the writing surface, at the current instant in time, when:
  the distance is shorter than or equal to the sum of a minimum current distance and a tolerance, said tolerance being representative of an uncertainty regarding the distance between the writing surface and the bearing surface;
  the movement parameter is representative of a movement that is essentially tangential to the writing surface, i.e. its value is lower than or equal to a tangential movement threshold; and
  a norm of the amplitude parameter is higher than or equal to a minimum amplitude threshold;
otherwise determining a state of non-contact between the tip and the writing surface, at the current instant in time.

BRIEF DESCRIPTION OF THE DRAWINGS

The invention will be better understood on studying a few embodiments described by way of wholly non-limiting examples and illustrated by the appended drawings in which.

Figure 1:
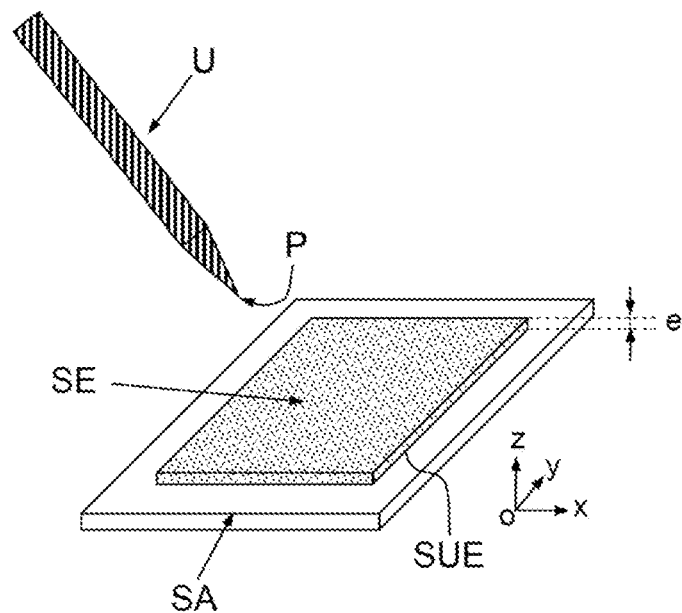
FIGS. 1 to 10 schematically illustrate a method according to one aspect of the invention.
Figure 2:
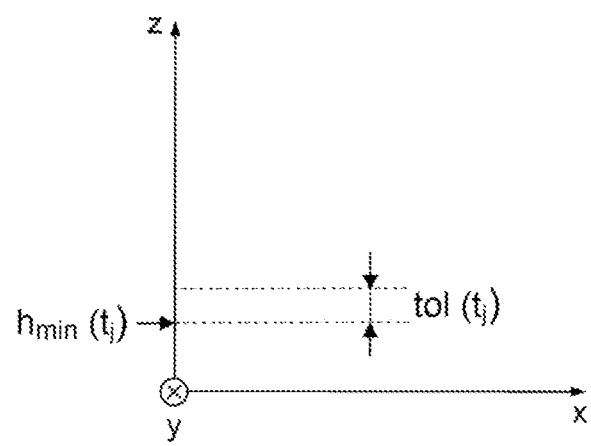

In all of the figures, elements having identical labels are similar.

DETAILED DESCRIPTION

The method and the system of the invention assume that an estimate of the position of the tip P of an instrument U, such as a stylus or pen, with respect to a planar reference or bearing surface SA, on which the writing medium SUE comprising a writing surface SE is placed, is available at each instant in time $t_i$. The writing medium SUE, for example a notepad or notebook, may deform to a greater or lesser degree. The aim of the invention is to make it possible to decide whether or not, at an instant in time $t_i$, the tip of the instrument is in contact with the writing medium.

A coordinate system (O,X,Y,Z) linked to the reference surface is defined such that the X and Y axes are parallel to the writing surface SE and the Z axis is perpendicular to this surface SE. The position Pos of the tip P of the instrument U at the instant in time $t_i$ is described in this coordinate system:

$$Pos(t_i) = \begin{bmatrix} x(t_i) \\ y(t_i) \\ z(t_i) \end{bmatrix} = \begin{bmatrix} t(t_i) \\ z(t_i) \end{bmatrix} \quad (1)$$

The components x and y along the X and Y axes are referred to as tangential components and are represented by the vector $t(t_i)$. The component z along the Z axis is referred to as the normal component. The distance between the tip P and the bearing surface SA is denoted by h ($h=\|z\|$)

For example, the instrument U may be provided with a fixed magnetic element EM and the tracking device DL used may be provided with an array R of at least N triaxial magnetometers $M_i$ which are mechanically connected to one another with no degree of freedom in order to hold a known relative position of these magnetometers $M_i$, N being an integer at least equal to 2. A similar instrument U and tracking device DL are for example described in documents FR 2988862 and FR 2988874.

However, the invention also applies to a digitization system based on ultrasonic tracking in which an ultrasound emitter is linked to the instrument and an ultrasound receiver system is linked to the writing surface. The invention also applies to an optical tracking system using a camera that is able to determine the position of a point of the instrument in three dimensions.

Throughout the rest of the description, the method is described using a moving window using n successive values, but it can also be applied without a moving window, i.e. to a single datum at a time (n=1), which amounts to considering a moving window comprising a single data sample at a time.

The n last estimates of the position of the tip P of the instrument U are placed in a moving window:

$$Pos(t_{i-n+1}) \ldots Pos(t_{i-1}) Pos(t_i) \quad (2)$$

The decision time $t_j \in t_{i-n+1} \ldots t_i$ is defined as the instant in time for which the decision (contact or non-contact) is made. Past instants in time with respect to the instant in time $t_j$ are denoted by the instants in time $t_k$, such that $t_{i-n+1} \le t_k < t_j$. Future instants in time are denoted by the instants in time $t_k$, such that $t_j < t_k \le t_i$.

A movement vector at the instant in time $t_i$ is defined as being:

$$dPos(t_i) = Pos(t_i) - Pos(t_{i-1}) \quad (3)$$

Like for the positions, a moving window is formed for the movements at successive instants in time:

$$dPos(t_{i-n+2}) \ldots dPos(t_i)$$

A movement may consist of a tangential movement $dt(t_i)$ corresponding to the two X and Y axes, and of a normal movement $dz(t_i)$:

$$dPos(t_i) = \begin{bmatrix} dx(t_i) \\ dy(t_i) \\ dz(t_i) \end{bmatrix} = \begin{bmatrix} x(t_i) - x(t_{i-1}) \\ y(t_i) - y(t_{i-1}) \\ z(t_i) - z(t_{i-1}) \end{bmatrix} = \begin{bmatrix} t(t_i) - t(t_{i-1}) \\ z(t_i) - z(t_{i-1}) \end{bmatrix} = \begin{bmatrix} dt(t_i) \\ dz(t_i) \end{bmatrix} \quad (4)$$

The movement amplitude at the instant in time $t_i$ is denoted by the scalar value:

$$\|dPos(t_i)\| \quad (5)$$

A movement parameter at the instant in time $t_i$ (denoted by $PM(t_i)$) makes it possible to determine whether the movement is more tangential with respect to the writing surface or else more normal to the writing surface.

The movement parameter does not provide useful information if the amplitude of the movement is low. This is due to noise in the estimate of the position Pos of the tip P (and hence in the movement). It is therefore necessary to link the tests on the movement parameter to a test on the movement amplitude in order to have certainty regarding these tests.

It is possible to use, for example, the ratio of the normal movement to the norm of the movement as an indicator:

$$PM(t_i) = \frac{dz(t_i)}{\|dPos(t_i)\|} \quad (6)$$

The value of this parameter is between −1 and 1. The value 1 corresponds to a movement that is entirely normal to the writing surface SE (i.e. when the tip P is moved away from the writing surface SE). The value 0 corresponds to a movement that is perfectly parallel to the writing surface SE. The value −1 corresponds to a movement that is entirely normal to the writing surface SE when the tip P is moved toward the writing surface SE.

It is possible to use the ratio of the absolute value of the normal movement (or distance h) to that of the norm of the movement as a movement parameter:

$$PM(t_i) = \frac{|d(t_i)|}{\|dPos(t_i)\|} = \frac{dh(t_i)}{\|dPos(t_i)\|} \quad (6)$$

This form is simple to compare to a threshold since the result is comprised between 0 and 1. The value 1 corresponds to a movement that is entirely normal to the surface. The value 0 corresponds to a movement that is perfectly parallel to the writing surface SE (or more precisely the bearing surface SA).

It is also possible to use the value of the normal component of the movement $dz(t_i)$ or the variation in the distance $dh(t_i)$, which gives the amplitude of the movement in the normal direction. Generally, when the tip P of the instrument U is in contact with the writing surface SE, this component varies little over time. However, when the instrument U is not in contact with the writing surface SE, it is difficult to keep it at a low value. For a greater degree of certainty, it would be better also to require that the amplitude $dPos(t_i)$ of the movement exceed a threshold $dPos_{min}$ in order to determine the nature of the movement.

A moving window containing the values of the movement parameter $PM(t_i)$ at various successive instants in time is formed:

$$[PM(t_{i-(n-1)}) \ldots PM(t_j)] \quad (7)$$

Two other parameters are estimated each time a new estimate of the position $Pos(t_j)$ of the tip P of the instrument U is received:

the minimum level of the contact surface at the decision time $h_{min}(t_j)$;

the tolerance $tol_h(t_j)$ regarding the level of the contact surface or writing surface SE at the decision time (uncertainty regarding the level of the contact surface).

FIG. 1 shows the various parameters describing the writing surface SE.

Lastly, it is possible to define a Boolean variable CONTACT which describes the state of contact between the tip P of the instrument U and the writing surface SE.

The remainder of the description describes one non-limiting embodiment of the present invention in detail.

Initially, the minimum level of the contact surface or, stated otherwise, the current value of the minimum distance $h_{min}(t_i)$ between the bearing surface SA and the writing surface SE of the writing medium SUE $h_{min}(t_i)$ is unknown. It is initialized to the maximum tolerable value of the thickness of the writing medium, for example 3 cm, under the assumption that this is the maximum thickness of a notebook.

The tolerance is set to an initial value, for example 1 mm, and the tip P of the instrument U is considered to be in a state of non-contact. The method next waits until n estimates of the position of the tip P of the instrument U have been received.

Figure 3:
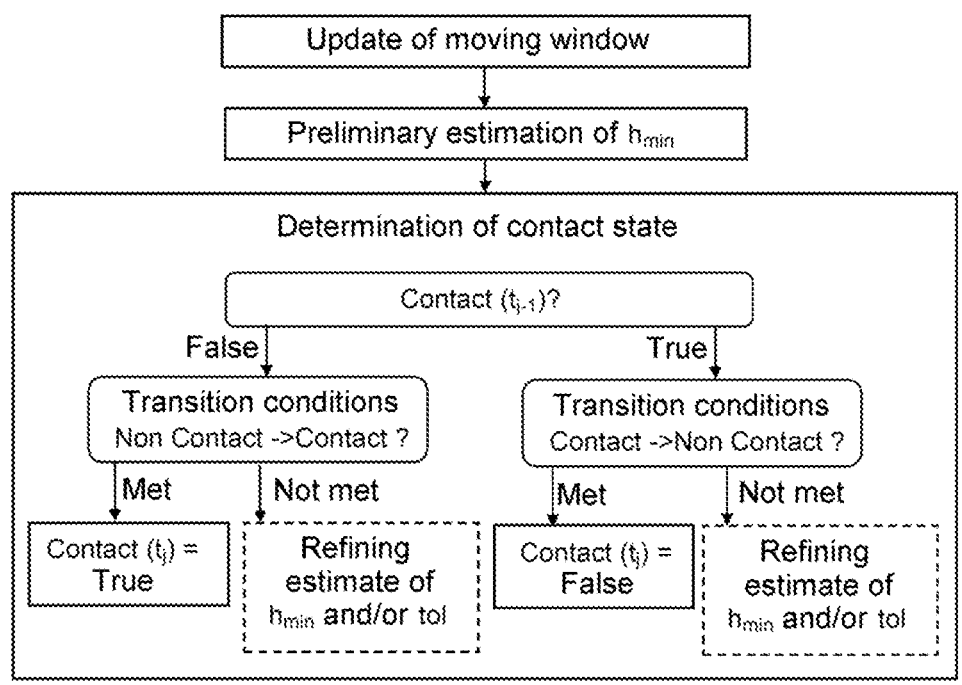

The iterative processing operation of the method, as illustrated in FIG. 3, comprises the following steps:

each time the position of the tip P of the instrument U is estimated again, the values of the parameters taken into account in the moving window (Pos, h, PM, dPos, tol) are updated;

a preliminary estimate of the minimum distance $h_{min}(t_j)$ between the bearing surface SA and the tip P is made; and a state of contact or of non-contact between the tip P of the instrument U is determined and, potentially, the estimate of the minimum distance $h_{min}(t_j)$ between the bearing surface SA and the tip P and/or the estimate of the tolerance $tol(t_j)$ is refined.

Regarding the updating of the moving window, at an estimation time $t_i$, the following values are available:

$$Pos(t_{i-n+1}); \ldots Pos(t_{i-1}); Pos(t_j) \quad (8)$$

$$[dPos(t_{i-n+2})); \ldots dPos(t_{i-1}); dPos(t_i)] \quad (9)$$

$$[PM(t_{i-n+2})) \ldots PM(t_i)] \quad (10)$$

$$h_{min}(t_{j-1}) \quad (11)$$

$$tol_h(t_{j-1}) \quad (12)$$

$$Contact(t_{j-1})(\text{true or false}) \quad (13)$$

The method of the invention aims to estimate $h_{min}(t_j)$, $tol(t_j)$ and $Contact(t_j)$, where $t_j \in [\![ t_{i-n+1}; t_i ]\!]$. These parameters depend on the state of contact (Boolean having a value of 1 for a state of contact and 0 for a state of non-contact, respectively) at the preceding instant in time ($t_{j-1}$) as well as the value of the various calculated parameters.

Initially, a preliminary estimate of the minimum level of the contact surface, or minimum distance $h_{min}(t_j)$ between the bearing surface SA and the tip P, at the instant in time j, is made. This estimate may be calculated in several ways according to the number of points recorded and the position of the decision time in the window.

For example, $h_{min}(t_j)$ may be compared to the vertical distance ($h(t_j)$) of the tip P of the instrument U at one and the same instant in time. If $h(t_j) < h_{min}(t_j)$ then $h_{min}(t_j) = h(t_j)$.

This comparison may also be made with respect to all of the points of the moving window, to the mean value, or else to the median value of the window. It may also be made with respect to the future instants in time or else to the past instants in time, with respect to the instant in time of the moving window that is considered to be the current instant in time.

The use of a mean value $h_{mean}(t_j)$ across all or else a portion of the points of the moving window allows the effect of noise to be decreased:

$$h_{Mean}(t_j) = \frac{\sum_{k=l}^{m} h(t_k)}{m - l + 1}$$

in which:

$$i - n + 1 \leq l \leq m \leq i$$

n represents the number of points of the moving window;

i: index of the first point of the portion used for calculating the mean (median or else the minimum value) of the points of the moving window;

m: index of the last point of the portion of the points of the moving window;

m−l+1: number of points in this portion.

The higher the level of noise in the estimate of the position Pos of the tip P, the greater the number of points required to limit its effect.

So as not to have much delay (in detecting the state of contact or non-contact), it would be better to decrease the number of points in the moving window succeeding the decision time $t_j$.

Determining the state of contact or of non-contact at the instant in time $t_j$ is conditional upon the preceding state $t_{j-1}$ as well as on all or some of the parameters saved in the moving window.

Therefore a machine with two states (contact/non-contact) is defined. The transition from one state to another is carried out using tests and thresholds which are adapted to the tracking device DL allowing the position of the tip P of the instrument U to be estimated. These thresholds may also be optimized according to a writing or drawing style.

These tests are divided into two categories: obligatory tests that are able to operate with a system of quite high accuracy, and optional tests that make it possible to make up for certain imperfections in the estimation of the position Pos of the tip P and deformations of the writing support SUE, i.e. of the writing surface SE.

The tolerance $tol_h(t_j)$ regarding the level of the writing surface SE may be either fixed (suitable for the case in which the tracking device for estimating the position of the tip of the instrument is quite accurate and the medium does not deform very much) or variable, in which case its estimate will be refined according to the outcome of the tests.

The conditions for transitioning from the state of non-contact to the state of contact comprise the following obligatory conditions:

The vertical position of the tip P or, stated otherwise, the distance $h(t_j)$ between the bearing surface SA and the tip P, at the instant in time $t_j$ is below the minimum level $h_{min}(t_j)$ of the contact surface or writing surface SE to which the tolerance tol regarding the level of the contact surface SE is added.

The movement parameter $PM(t_j)$ of the tip P indicates a movement parallel to the writing surface SE. In addition, it is necessary to couple this condition to a minimum condition (threshold) on the movement amplitude parameter $\|dPos(t_j)\| \geq dPos_{min}$.

These two conditions must be met to transition from the state of non-contact to the state of contact.

Figure 4:
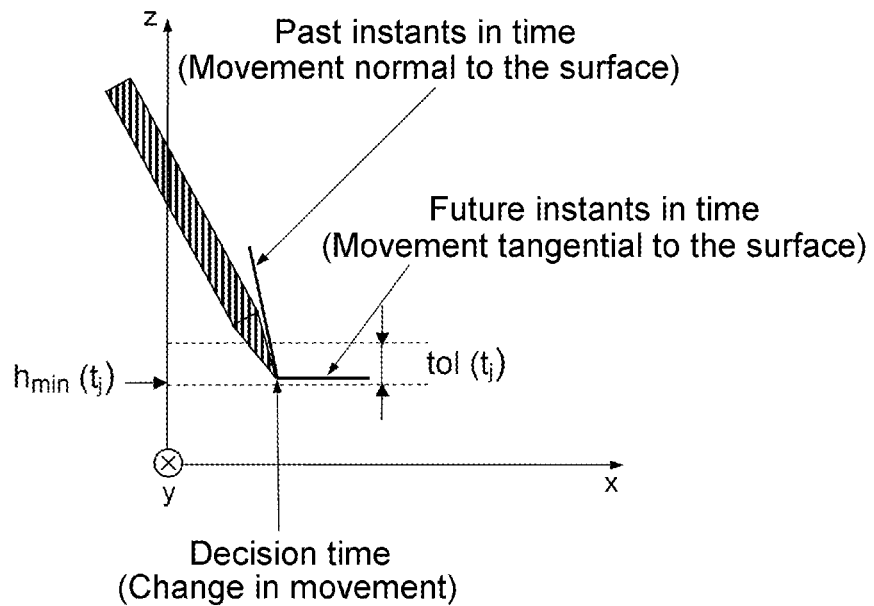

The movement amplitude $dPos(t_j)$ and the movement parameter $PM(t_j)$ may be either calculated solely at the decision time ($t_j$) or else at multiple instants in time of the moving window, i.e. by combining future instants in time and past instants in time of the moving window (for example, maximum value, minimum value, mean value or else median value). For example, this makes it possible to detect the moment of transition between vertical movement and horizontal movement, as shown in FIG. 4, which corresponds generally to the moment of contact between the tip P and the writing surface SE.

The movement is essentially normal to the writing surface SE before the start of writing, after which it is tangential to the surface during writing. It is possible, for example, to calculate a weighted mean of this parameter PM at future instants in time and to determine whether or not it corresponds to a movement that is tangential to the surface.

Figure 5:
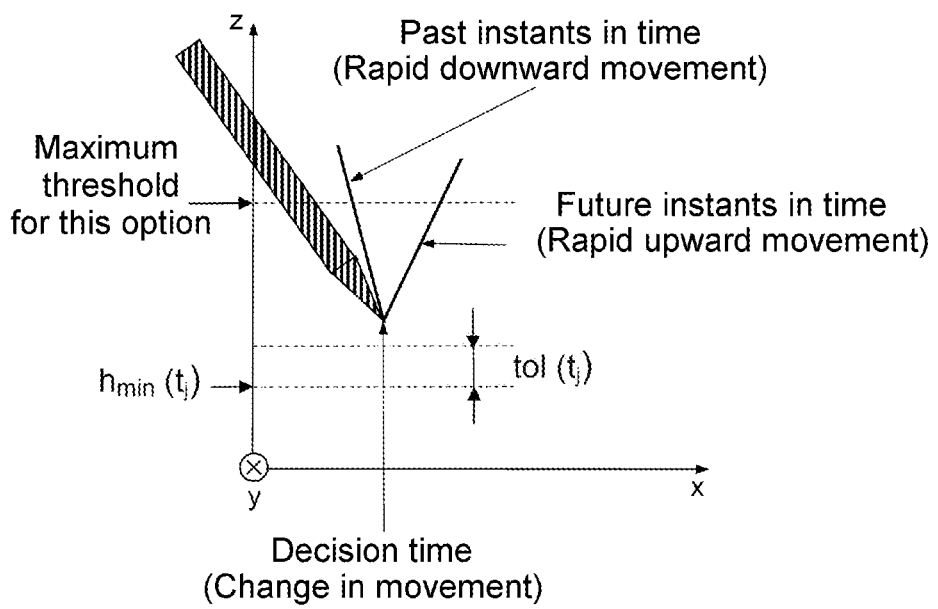

One additional optional condition may be to perform low-pass filtering of the position of the tip P or solely of the normal component Z of the position; it is possible that rapid movements, such as the writing of a period, do not meet the obligatory conditions. In this case, an optional condition is added which allows this problem to be managed. FIG. 5 shows this case.

If the tip P of the instrument U performs a downward movement followed by an upward movement, and the position Pos of the tip P at the decision time is below a maximum threshold for the distance to the bearing surface SA provided for this option, then a transition to the contact state is made for a single iteration.

In order for this to be detected, it is possible to use the movement parameter at the preceding instant or instants in time and the movement parameter at the succeeding instant or instants in time, and to detect the moment at which there is a rapid downward movement followed by a rapid upward movement.

It is also possible to have recourse to combinations, for example linear combinations, of the past instants in time and combinations, for example linear combinations, of the future instants in time in order to detect the moment of contact between the tip P of the instrument U and the writing surface, for example, to calculate the mean, the median value, etc.

With regard to refining the tolerance tol regarding the level of the contact surface SE in the state of non-contact, if none of the conditions is met, a state of non-contact is retained. Additionally, it is possible to refine the tolerance in order to make up for certain problems such as inaccuracy of the tracking device DL of the tip P, flexion of the paper when writing and an increase in the thickness of the writing support SUE (the decrease being managed by means of the preliminary estimation of the level of the writing surface SE).

Figure 6:
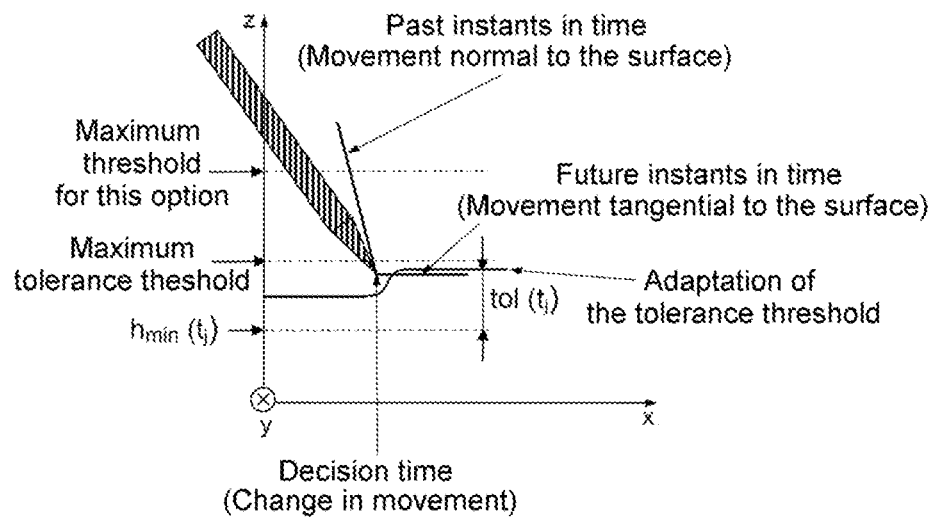

If the movement parameter PM allows a tangential movement to be detected such that the tip P is below a maximum threshold, then the tolerance is incremented. This technique makes it possible to reach the new thickness of the writing support SUE quickly and not to lose many points due to such a change. The outcome may therefore be highly satisfactory but depends on the acquisition frequency of the tracking device. This is illustrated in FIG. 6.

It is also possible to save the past instants in time while the movement is substantially tangential and as soon as the tolerance reaches the new thickness; it is possible to correct the decisions of these past instants in time by assuming that there was contact. This makes it possible to catch up in the event of substantial changes in the thickness of the support, and is useful when the deformation of the support is very substantial or else when the system is not sufficiently accurate.

The conditions for transitioning from the state of contact to the state of non-contact comprise the following obligatory conditions:

The vertical position of the tip P or, stated otherwise, the distance $h(t_j)$ between the bearing surface SA and the tip P, at the instant in time $t_j$ is above the minimum level $h_{min}(t_j)$ of the writing surface SE to which the tolerance tol regarding the level of the contact surface SE is added.

The movement parameter $PM(t_j)$ of the tip P indicates a movement having a slope with respect to the writing surface SE that is greater than a threshold. Depending on the movement parameter used, it is necessary to couple this condition to a minimum condition (threshold) on the movement amplitude parameter $\|dPos(t_j)\| \geq dPos_{min}$.

Figure 7:
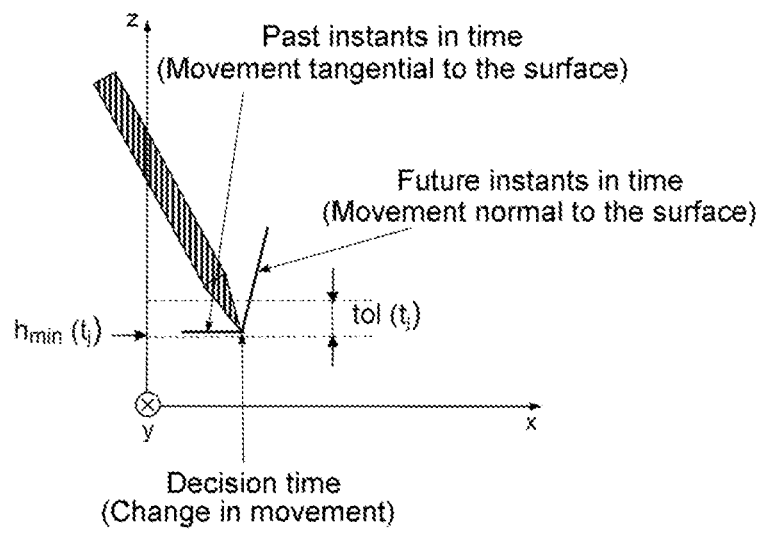

FIG. 7 shows a simple case of the end of contact between the tip P of the instrument U and the writing surface SE.

These obligatory conditions do not allow problems linked to flexion of the writing support SUE or faults in estimating the position of the tip P to be overcome. It is therefore possible to combine optional additional conditions making it possible to determine whether the tip P is indeed disconnected from the writing surface SE or if it is actually just a flexion of the writing surface SE, a change in thickness due to the writing surface SA not being perfectly parallel to the plane xy of the bearing surface SA, or else a problem linked to the accuracy of the acquisition device DL.

Figure 8:
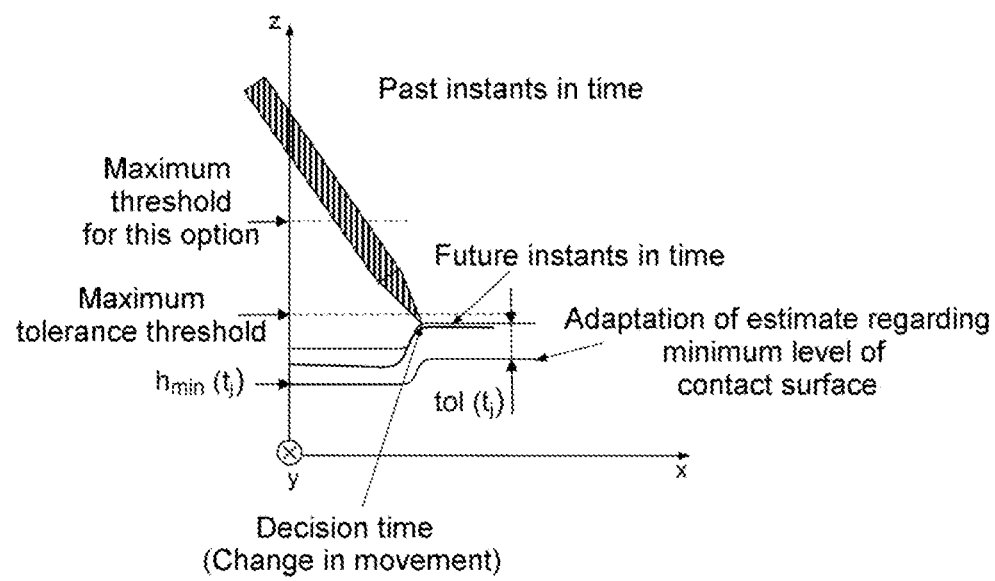

Such a case is illustrated in FIG. 8.

These optional conditions are based on the movement parameter PM (or else a combination of the values of the movement parameter at the past and/or future instants in time). Specifically, the topographical signature of the tip P during writing or drawing and that of a change in thickness do not differ, and it is sufficient to apply double thresholding:

more tolerant thresholding for the obligatory condition using the movement parameter PM; and stricter thresholding for the optional conditions which make it possible to transition to the state of non-contact only if a movement with a greater slope has been detected. Otherwise, the estimates of the following two parameters are refined:

the minimum level of the contact surface at the decision time $h_{min}(t_j)$;

the tolerance regarding the level of the writing surface at the decision time $tol_h(t_j)$ (uncertainty regarding the level of the writing surface).

The term "thresholding" is understood to mean comparing the movement parameter PM with a threshold. If it does not exceed the threshold, the estimates of the parameters are refined. This threshold makes it possible to state that the thickness of the support has probably changed, and that there is still contact.

Just like for the other conditions linked to the movement indicators PM, it is preferable to couple it to a test of the amplitude of the movement in order to obtain better results.

With regards to refining the estimate of the minimum distance $h_{min}(t_j)$ between the bearing surface SA and the writing surface SE in the state of contact.

If none of the optional conditions is met, a state of contact is retained. Additionally, it is possible to refine the estimate of the minimum level $h_{min}(t_j)$, of the writing surface SE. This makes it possible to adapt to changes in thickness when writing, for example if there are small bumps on the writing surface SE of the medium SUE or if the medium SUE is not perfectly parallel to the plane xy.

If the position Pos of the tip P of the instrument U, i.e. the distance $h(t_j)$, falls below the minimum level $h_{min}(t_j)$ of the writing surface to which the tolerance $tol(t_j)$ regarding the level of the writing surface SE is added, the value of the minimum level $h_{min}(t_j)$ of the writing surface SE is increased. This is valid up to a certain threshold so as not to favor false positives or false detections of contact. Thus, according to the thresholding parameters and the values of the increments, the solution is to a greater or lesser degree tolerant of defects in the level of the writing surface SE.

Figure 9:
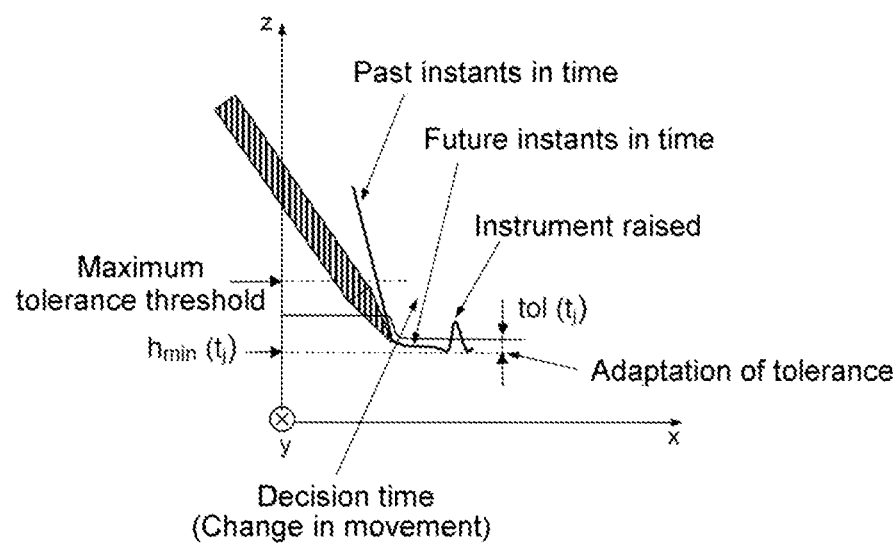

FIG. 9 illustrates an operation of refining the tolerance regarding the level of the writing surface in the state of contact.

When the obligatory conditions are not met, it is clear that the tip P is indeed in contact with the writing surface SE. In this case, it is optionally possible to take advantage of it in order to decrease the tolerance $tol(t_j)$ regarding the level of the writing surface SE. The tolerance $tol(t_j)$ may not fall below a minimum threshold in order to avoid problems related to gaps in the lines drawn due to imperfections.

This operation makes it possible to detect losses of contact quickly, since when this range reaches its minimum value, raising the tip P results in it quickly departing from the tolerance zone and allows the obligatory conditions proposed above to be met.

Figure 10:
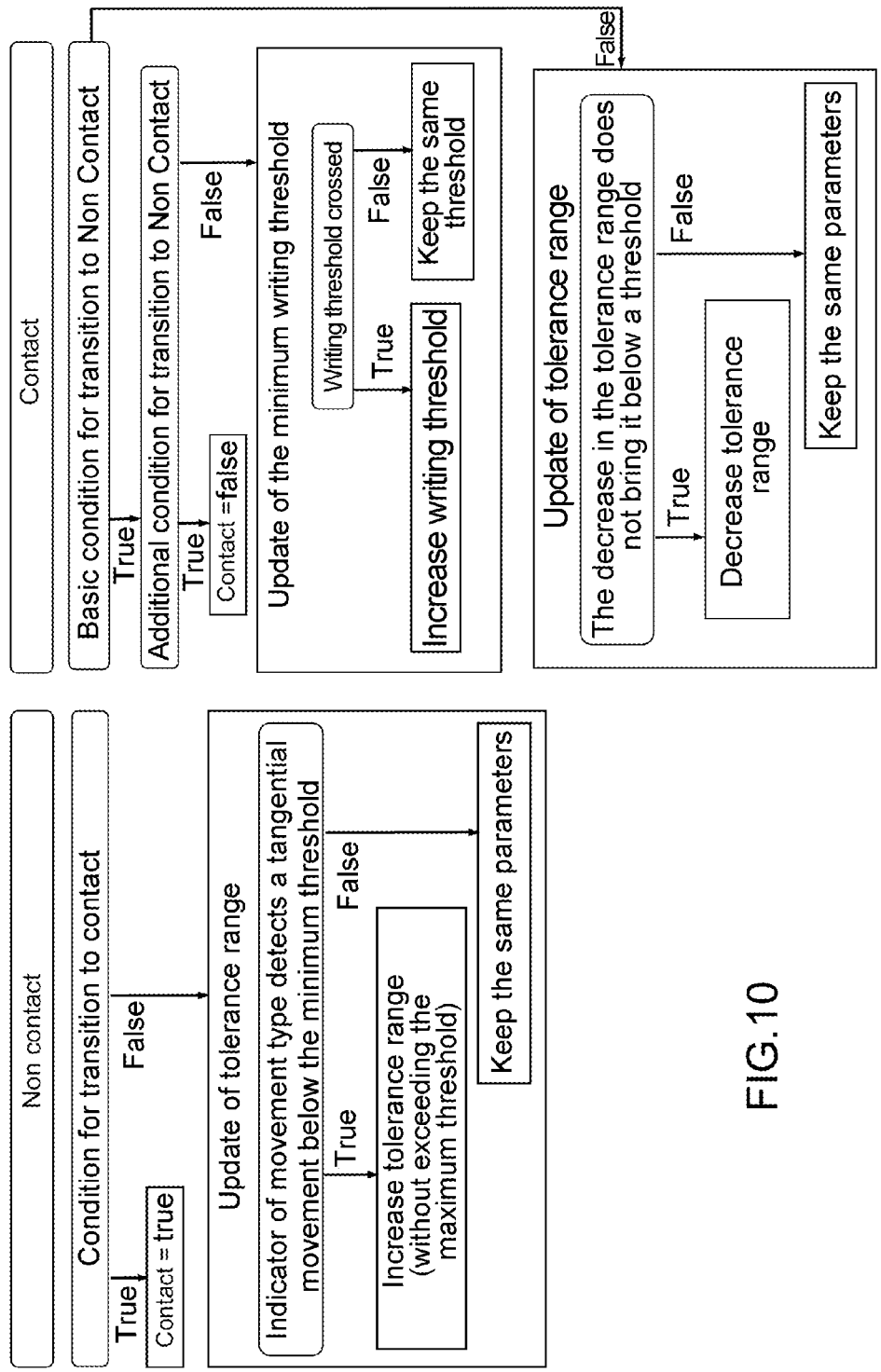

FIG. 10 illustrates an exemplary state machine (contact or non-contact) with the optional updating of the tolerance $tol(t_j)$.

The steps of the method described above may be carried out by one or more programmable processors executing a computer program in order to carry out the functions of the invention by processing input data and generating output data.

A computer program may be written in any form of programming language, including compiled or interpreted languages, and the computer program may be deployed in any form, including as a stand-alone program or as a sub-program, element or other unit suitable for use in a computer environment. A computer program may be deployed so as to be executed on one computer or on multiple computers on one site or distributed across multiple sites and connected to one another by a communication network.

The invention claimed is:

1. A method for continuously detecting a state of contact or non-contact between a tip of an instrument and a writing surface of a writing medium of variable thickness positioned on a bearing surface of a tracking device; said method comprising the steps consisting in:
   determining, at a current instant in time, the position of the tip of the instrument with respect to the bearing surface;
   determining, at the current instant in time, a distance between the bearing surface and the tip, on the basis of said position of the tip;
   updating the current value of a minimum distance between the bearing surface and the writing surface with the distance between the bearing surface and the tip at the current instant in time, when said distance is shorter than the current value of the minimum distance;
   determining, at the current instant in time, a movement parameter of the tip, representative of a ratio of the movement tangential to the writing surface to the movement normal to the writing surface between the current instant in time and the preceding instant in time;
   determining, at the current instant in time, an amplitude parameter representative of the amplitude of the movement of the tip between the current instant in time and the preceding instant in time;
   determining a state of contact between the tip and the writing surface, at the current instant in time, when:
      the distance is shorter than or equal to the sum of a minimum current distance and a tolerance, said tolerance being representative of an uncertainty regarding the distance between the writing surface and the bearing surface;
      the movement parameter is representative of a movement that is essentially tangential to the writing surface, i.e. its value is lower than or equal to a tangential movement threshold; and
      a norm of the amplitude parameter is higher than or equal to a minimum amplitude threshold;
      otherwise determining a state of non-contact between the tip and the writing surface, at the current instant in time.

2. The method as claimed in claim 1, in which a moving time window is used in which respective weighted means are used for said position, and/or said distance, and/or said movement parameter, and/or said amplitude parameter; the moving window comprising a set of data samples corresponding to a set of successive instants in time in which a current instant in time is considered, the other instants in time of the set preceding the current instant in time being considered to be past instants in time with respect to the moving window, and the other instants in time succeeding the current instant in time being considered to be future instants in time with respect to the current moving window.

3. The method as claimed in claim 1, additionally comprising a step consisting in updating said tolerance when two successive operations of determining a state of contact or non-contact determine one and the same state.

4. The method as claimed in claim 3, in which, when two successive operations of determining a state determine a state of contact, said tolerance is decreased without being able to be below a minimum tolerance threshold.

5. The method as claimed in claim 4, in which, when the movement parameter is representative of a movement that is essentially tangential to the writing surface, i.e. its value is lower than or equal to the tangential movement threshold, and when the distance is longer than the sum of the current minimum distance and the tolerance, the current minimum distance is increased.

6. The method as claimed in claim 3, in which, when two successive operations of determining a state determine a state of non-contact and the value of the movement parameter is lower than a maximum movement threshold, said tolerance is increased without being able to be above a maximum tolerance threshold.

7. The method as claimed in claim 1, in which the instrument is provided with a fixed magnetic element and the tracking device used is provided with an array of at least N triaxial magnetometers which are mechanically connected to one another with no degree of freedom in order to hold a known relative position of these magnetometers, N being an integer at least equal to 2.

8. A system for continuously detecting a state of contact or non-contact between a tip of an instrument and a writing surface of a writing medium of variable thickness positioned on a bearing surface of a tracking device; said system comprising a computer capable of:
   determining, at a current instant in time, the position of the tip of the instrument with respect to the bearing surface;
   determining, at the current instant in time , a distance between the bearing surface and the tip, on the basis of said position of the tip;
   updating the current value of a minimum distance between the bearing surface and the writing surface with the distance between the bearing surface and the tip at the current instant in time, when said distance is shorter than the current value of the minimum distance;
   determining, at the current instant in time, a movement parameter of the tip, representative of a ratio of the movement tangential to the writing surface to the movement normal to the writing surface between the current instant in time and the preceding instant in time;
   determining, at the current instant in time, an amplitude parameter representative of the amplitude of the movement of the tip between the current instant in time and the preceding instant in time;
   determining a state of contact between the tip and the writing surface, at the current instant in time, when:
      the distance is shorter than or equal to the sum of a minimum current distance and a tolerance, said tolerance being representative of an uncertainty regarding the distance between the writing surface and the bearing surface;
      the movement parameter is representative of a movement that is essentially tangential to the writing surface, i.e. its value is lower than or equal to a tangential movement threshold; and
      a norm of the amplitude parameter is higher than or equal to a minimum amplitude threshold;
      otherwise determining a state of non-contact between the tip and the writing surface, at the current instant in time.

* * * * *